US012625522B2

(12) United States Patent
Huang et al.

(10) Patent No.: US 12,625,522 B2
(45) Date of Patent: May 12, 2026

(54) SUPPORT STRUCTURE AND ELECTRONIC DEVICE USING THE SAME

(71) Applicant: LITE-ON Technology (Chang Zhou) Co., LTD., Jiangsu Province (CN)

(72) Inventors: Bin Huang, Jiangsu Province (CN); Xiao-Qiang Liang, Jiangsu Province (CN)

(73) Assignee: LITE-ON TECHNOLOGY (CHANG ZHOU) CO., LTD., Jiangsu Province (CN)

( * ) Notice: Subject to any disclaimer, the term of this patent is extended or adjusted under 35 U.S.C. 154(b) by 0 days.

(21) Appl. No.: 19/000,778

(22) Filed: Dec. 24, 2024

(65) Prior Publication Data

US 2025/0362714 A1 Nov. 27, 2025

(30) Foreign Application Priority Data

May 24, 2024 (CN) .......................... 202421162162.0

(51) Int. Cl.
*G06F 1/16* (2006.01)
*G06F 3/041* (2006.01)
(52) U.S. Cl.
CPC .......... *G06F 1/1675* (2013.01); *G06F 1/1643* (2013.01); *G06F 3/0412* (2013.01)

(58) Field of Classification Search
None
See application file for complete search history.

(56) References Cited

U.S. PATENT DOCUMENTS

| | | | | |
|---|---|---|---|---|
| 2003/0188960 A1* | 10/2003 | Hsu | ........................ | G06F 1/1662 |
| | | | | 200/344 |
| 2019/0096602 A1* | 3/2019 | Yen | ......................... | H01H 13/20 |
| 2020/0402735 A1* | 12/2020 | Chuang | ................ | H01H 13/704 |
| 2022/0189715 A1* | 6/2022 | Hsu | ......................... | H01H 13/86 |

* cited by examiner

*Primary Examiner* — Robin J Mishler
(74) *Attorney, Agent, or Firm* — WPAT, PC

(57) ABSTRACT

A support structure including a first component and a second component is provided. The first component includes first levers, first pivot portions and second pivot portions. The first and second pivot portions are respectively disposed on opposite sides of the first levers. Each of the first pivot portions has a first rotating shaft. Each of the second pivot portions has a second rotating shaft. The second component includes second levers, first assembly parts and second assembly parts. The first and second assembly parts are respectively provided on opposite sides of the second levers. Each of the first assembly parts has a first assembly hole, and each of the second assembly parts has a second assembly hole. The first assembly hole is arranged relative to the first rotating shaft, and the second assembly hole is arranged relative to the second rotating shaft.

17 Claims, 12 Drawing Sheets

SUPPORT STRUCTURE AND ELECTRONIC DEVICE USING THE SAME

This application claims the benefit of People's Republic of China application Serial No. 202421162162.0, filed May 24, 2024, the subject matter of which is incorporated herein by reference.

BACKGROUND OF THE INVENTION

Field of the Invention

The invention relates in general to a support structure and an electronic device using the same

Description of the Related Art

Touch panels provide a simple and intuitive input method for users. By converting the user's touch into electrical signals, the touch panel allows the user to operate by clicking, sliding, etc. Currently, a common method of manufacturing a touch panel structure is to form two sets of touch electrodes on different base materials, and then combine them together. When the user presses the touch panel at a position other than the center position, the touch panel often tilts, causing the pressing force to be unevenly distributed.

SUMMARY OF THE INVENTION

The present invention relates to a support structure and an electronic device using the same to improve the support stability of a touch panel.

According to one aspect of the present invention, a support structure including a first component and a second component is provided. The first component includes a plurality of first levers, a plurality of first pivot portions and a plurality of second pivot portions. The first pivot portions and the second pivot portions are respectively disposed on opposite sides of the first levers. Each of the first pivot portions has a first rotating shaft. Each of the second pivot portions has a second rotating shaft. The second component includes a plurality of second levers, a plurality of first assembly parts and a plurality of second assembly parts. The first assembly parts and the second assembly parts are respectively provided on opposite sides of the second levers. Each of the first assembly parts has a first assembly hole, and each of the second assembly parts has a second assembly hole. The first assembly hole is arranged relative to the first rotating shaft, and the second assembly hole is arranged relative to the second rotating shaft.

According to one aspect of the present invention, an electronic device including a board, a resilient dome and a supporting structure is provided. The board has a first surface and a second surface opposite to each other. The resilient dome is provided on the second surface. The support structure is provided on the second surface, and the support structure includes a first component and a second component. The first component and the second component can be pivotally connected and move up and down along with the board.

The above and other aspects of the invention will become better understood with regard to the following detailed description of the preferred but non-limiting embodiment(s). The following description is made with reference to the accompanying drawings.

DETAILED DESCRIPTION OF THE INVENTION

Figure 1A:
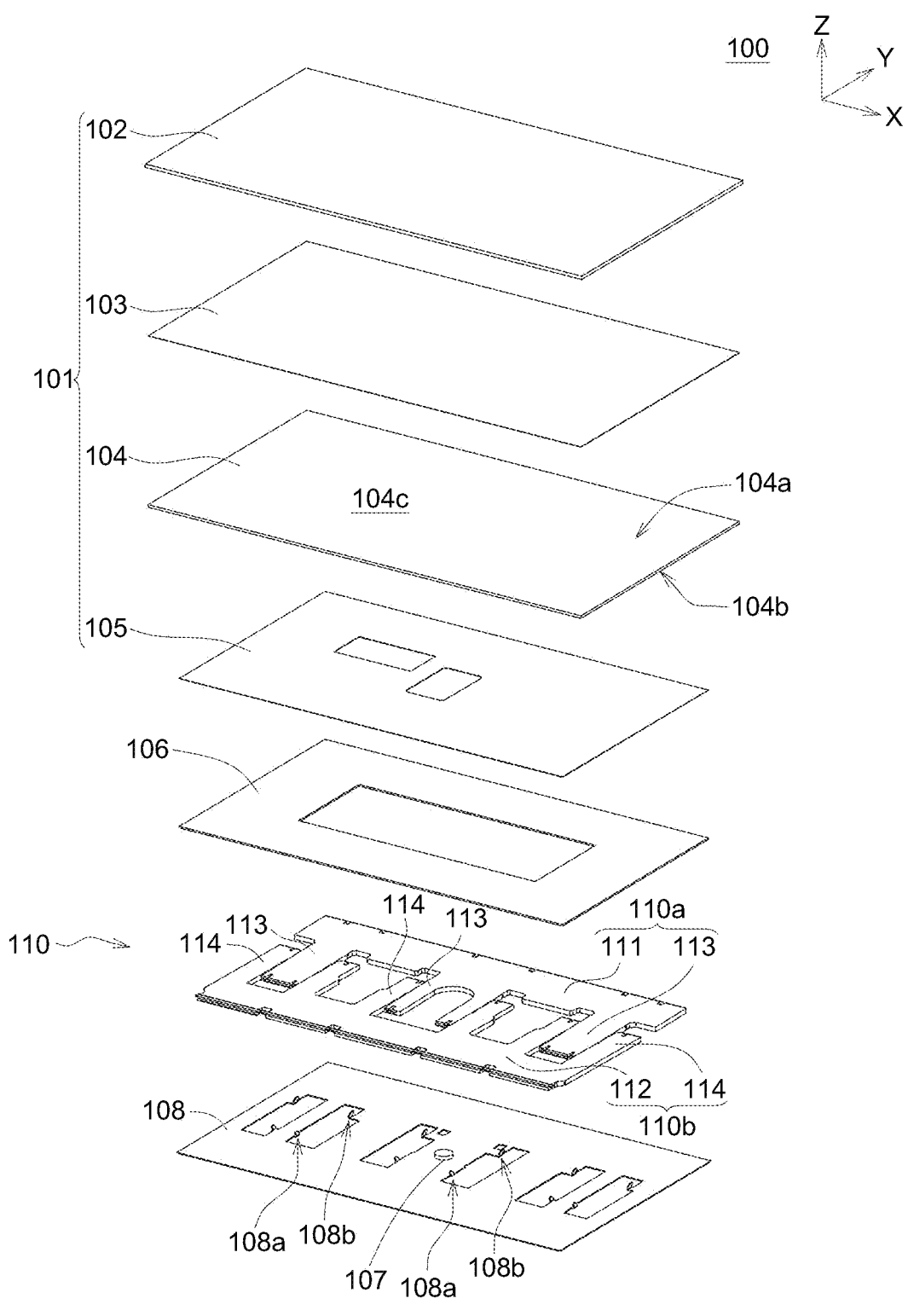
FIGS. 1A and 1B respectively are exploded diagrams of a touch panel structure in different viewing angles according to an embodiment of the present invention.

The technical solutions in the embodiments of the present invention will be clearly and completely described below with reference to the accompanying drawings in the embodiments of the present invention. It should be understood that the accompanying drawings are simplified schematic diagrams, and the described embodiments are only some embodiments of the present invention, rather than all embodiments. Therefore, only devices and combination relationships related to the present invention are shown for the purpose of clarifying the present invention. The basic structure or implementation methods of the invention are provided to provide a clearer description, but the actual components and layout may be more complex. In addition, for convenience of explanation, the detailed proportions of the devices shown in the drawings of the present invention can be adjusted according to design requirements.

Figure 1B:
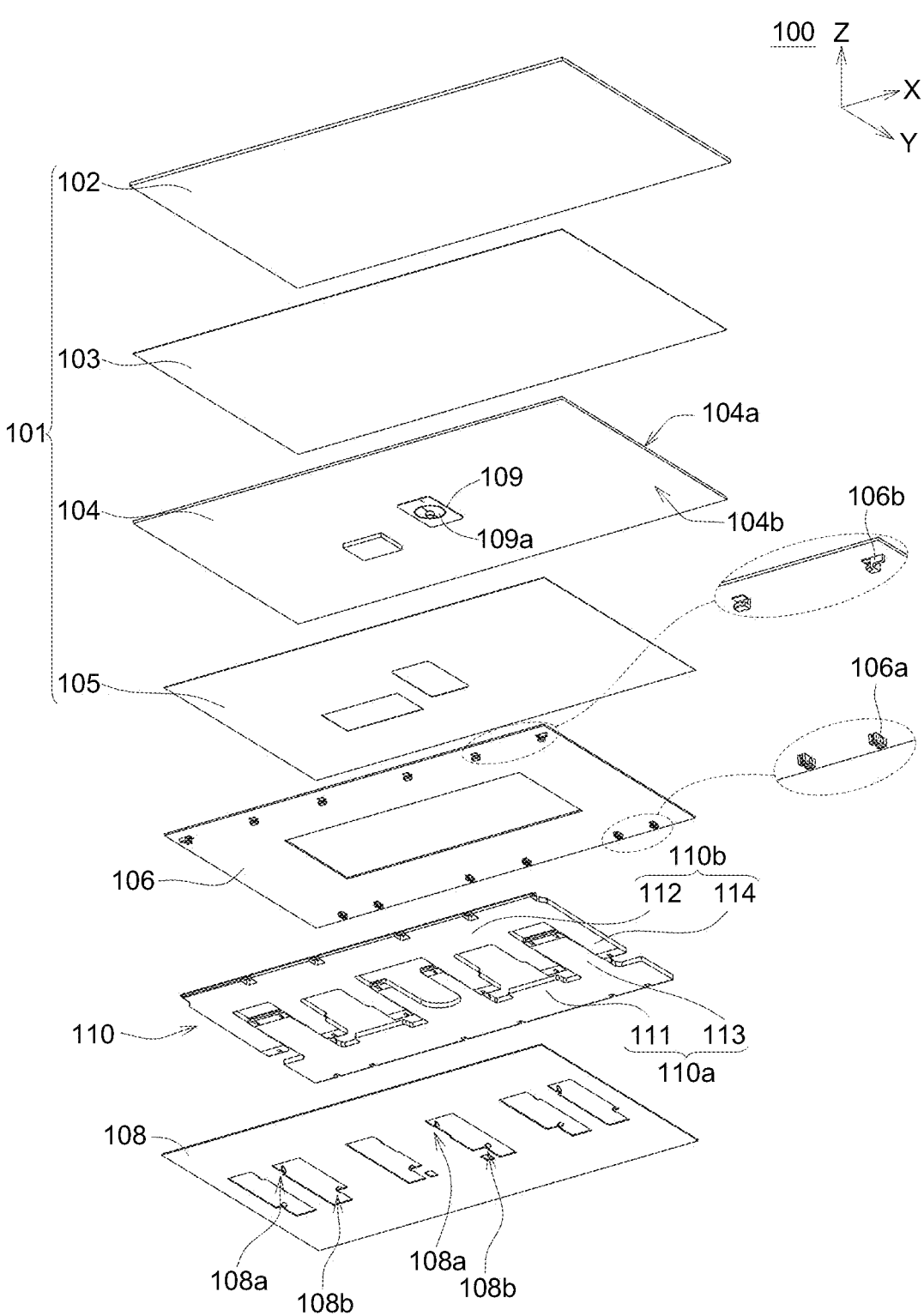
Figure 2:
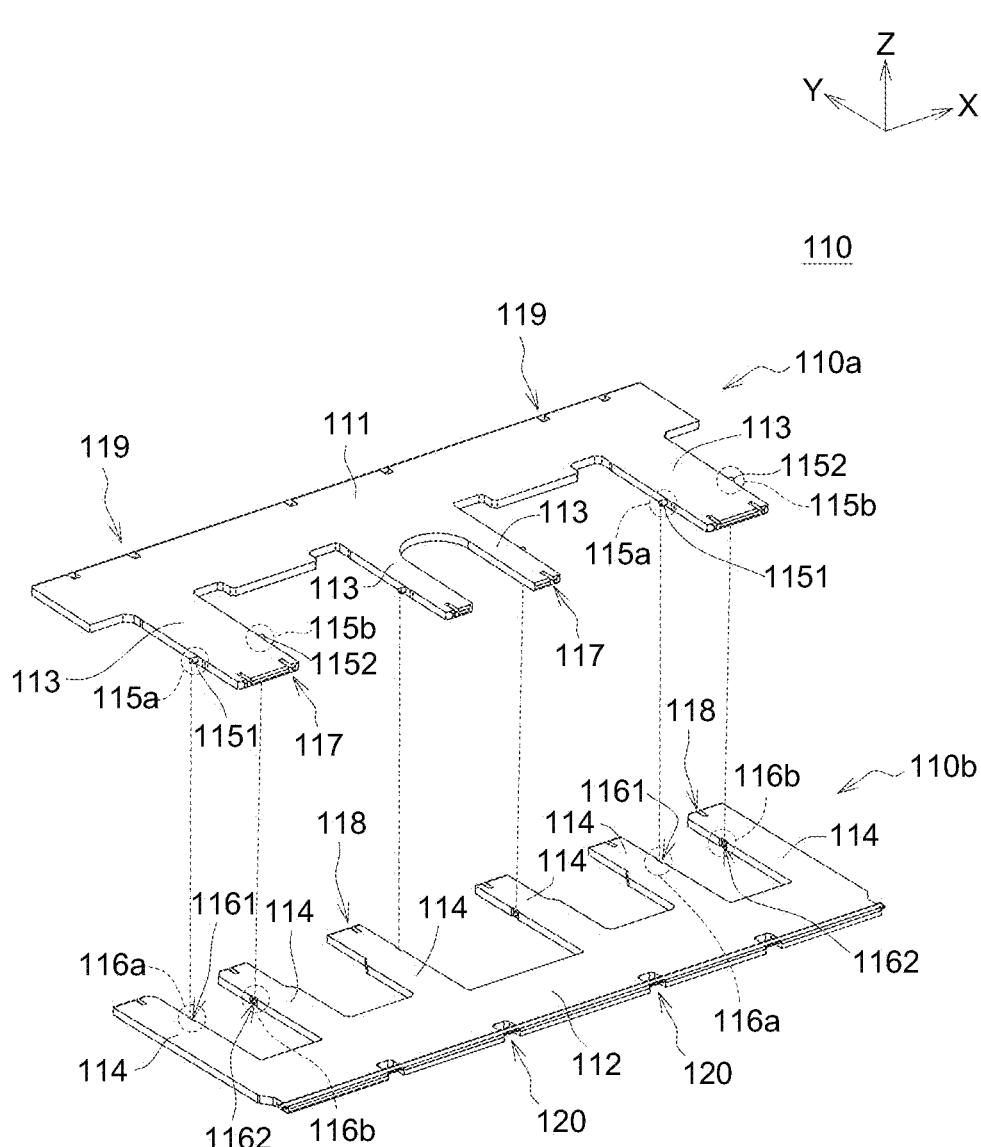
FIG. 2 is a schematic diagram of a support structure according to an embodiment of the present invention.
Figure 3:
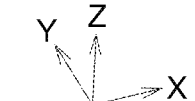
FIG. 3 is a schematic cross-sectional view of the positioning of the support structure and the limiting structure of the bottom plate according to an embodiment of the present invention.
Figure 3:
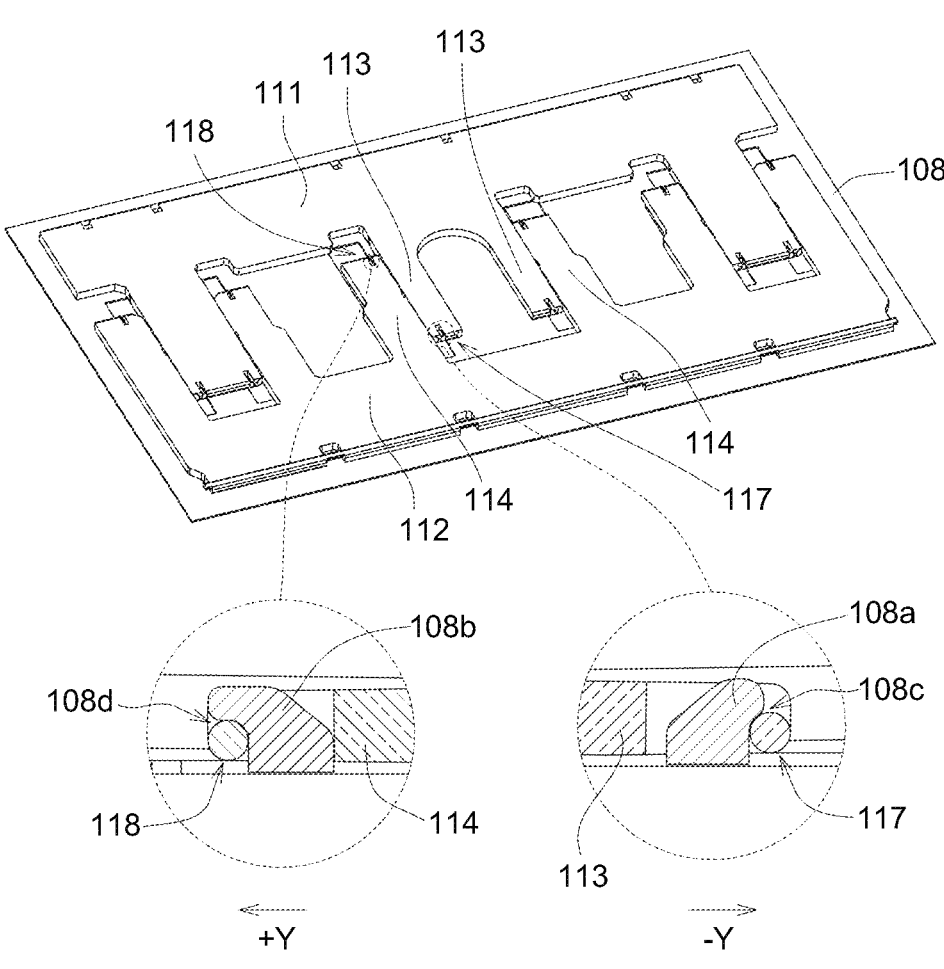

Please refer to FIGS. 1A, 1B, 2 and 3. FIGS. 1A and 1B respectively illustrate an exploded view of a touch panel structure 100 in different viewing angles according to an embodiment of the present invention. FIG. 2 illustrates a schematic diagram of the support structure 110 according to an embodiment of the present invention. FIG. 3 is a schematic cross-sectional view of the positioning of the support structure 110 and the limiting structure of the bottom plate 108 according to an embodiment of the present invention. In one embodiment, the touch panel structure 100 can be applied to an electronic product, where the touch panel structure 100 can be integrated into a notebook computer, a keyboard, or other electronic products that require an input interface to control mouse movement or screen scrolling.

The touch panel structure 100 includes a support structure 110 and a touch panel 101. The support structure 110 can be disposed between a top plate 106 and a bottom plate 108. For example, the support structure 110 is detachably connected or pivotally connected to the top plate 106 and the bottom plate 108. In one embodiment, the support structure 110 is, for example, a scissor lift structure or a butterfly lift structure. The support structure 110 can move up and down along the Z-axis direction relative to the bottom plate 108 to drive the top plate 106 and the touch panel 101 disposed on the top plate 106 to move up and down along the Z-axis direction.

Referring to FIGS. 1A and 1B, the touch panel 101 includes a transparent cover 102 (or transparent board), a board (such as a circuit board 104 or other forms of covers), a touch sensing circuit 104c and a resilient dome 109. In addition, the transparent cover 102 and the circuit board 104 are connected by, for example, a film 103, and the circuit board 104 and the top plate 106 are connected by, for example, another film 105. The circuit board 104 is disposed on the top plate 106, and the touch sensing circuit 104c is disposed on the first surface 104a of the circuit board 104. The touch sensing circuit 104c is used to sense the change in capacitance when a human body or a conductor touches it, so as to know the touch position. The resilient dome 109 is provided on the second surface 104b of the circuit board 104. The first surface 104a is opposite the second surface 104b. In addition, the bottom plate 108 is provided with a contact member 107, such as a circular mesa sponge. The contact member 107 protrudes from the bottom plate 108 and contacts the resilient dome 109 to reduce pressing noise. In one embodiment, the first surface 104a is, for example, an upper surface, and the second surface 104b is, for example, a lower surface. The circuit board 104 is, for example, a printed circuit board, the touch sensing circuit 104c is, for example, a capacitive sensing circuit, and the resilient dome 109 has an elastomer 109a, which is made of, for example, rubber, spring sheets or other elastic materials. When the elastomer 109a is pressed by an external force, the elastomer 109a deforms to make the touch panel 101 move downward. When the external force is released, the elastomer 109a pushes upward against the touch panel 101 and returns to its original position.

Referring to FIG. 2, the support structure 110 includes a first component 110a and a second component 110b. The first component 110a includes a plurality of first levers 113, a plurality of first pivot portions 115a and a plurality of second pivot portions 115b. The second component 110b includes a plurality of second levers 114, a plurality of first assembly parts 116a and a plurality of second assembly parts 116b. Each one of the plurality of first levers 113 is pivotally connected to a corresponding one of the plurality of second levers 114 to form a plurality of scissor lift structures. As shown in FIGS. 2 and 3, there are three first levers 113 and six second levers 114. From left to right, there are three scissor lift structures coaxially disposed between the top plate 106 and the bottom plate 108. Each of the scissor lift structure includes a first lever 113 and two adjacent second levers 114. The first lever 113 is disposed between the two adjacent second levers 114. Therefore, the first lever 113 may be referred to as an inner scissor lever, and the second levers 114 may be referred to as outer scissor levers. The first lever 113 can be a solid lever or a hollow lever. For example, the first lever 113 at the center is U-shape, and the first levers 113 at both sides are elongated shapes. The number of the first levers 113 and the second levers 114 is not limited.

Referring to FIG. 2, in one embodiment, the first component 110a includes a first plate 111 extending substantially along the X-axis direction, and the first levers 113 are arranged in parallel and extend horizontally from one side of the first plate 111. That is, the first levers 113 extend along the Y-axis direction. In addition, the second component 110b includes a second plate 112 extending substantially along the X-axis direction, and the second levers 114 are arranged in parallel and extend horizontally from one side of the second plate 112. That is, the second lever 114 extends along the Y-axis direction. The first levers 113 and the second levers 114 extend in opposite directions and are staggered, so that the first levers 113 and the second levers 114 are staggered in a direction perpendicular to their horizontal extension. In one embodiment, the length of the first component 110a or the second component 110b in the X-axis direction is greater than half of the length of the board (e.g., the circuit board 104) in the X-axis direction.

Referring to FIG. 2, the first pivot portion 115a and the second pivot portion 115b are respectively disposed on opposite sides of the first lever 113. The first pivot portion 115a has a first rotating shaft 1151, and the second pivot portion 115b has a second rotating shaft 1152. In one embodiment, the number of the first rotating shafts 1151 is, for example, three, and the number of the second rotating shafts 1152 is, for example, three, but the number is not limited thereto. The first rotating shaft 1151 extends outward from the side surface of the first lever 113, and the second rotating shaft 1152 extends outward from the other side surface of the first lever 113. The first rotating shaft 1151 and the second rotating shaft 1152 are coaxially arranged and protrude toward different extending directions.

In addition, referring to FIG. 2, the first assembly part 116a and the second assembly part 116b are respectively disposed on opposite sides of the second lever 114. The first assembly part 116a has a first assembling hole 1161, and the second assembly part 116b has a second assembly hole 1162. The first assembly hole 1161 is configured relative to the first rotating shaft 1151, and the second assembly hole 1162 is configured relative to the second rotating shaft 1152. In one embodiment, there are three first assembly holes 1161 and three second assembly holes 1162. The first assembly holes 1161 are recessed inwardly from one side of the second lever 114, and the second assembly holes 1162 are recessed inwardly from other side of the second lever 114. The first assembly hole 1161 and the second assembly hole 1162 are coaxially arranged and face different directions.

In one embodiment, the first rotating shaft 1151 can be correspondingly inserted into the first assembly hole 1161 and rotate in the first assembly hole 1161, and the second rotating shaft 1152 can be correspondingly inserted into the second assembly hole 1162 and rotate in the second assembly hole 1162. The first pivot portion 115a and its first rotating shaft 1151 as well as the second pivot portion 115b and its second rotating shaft 1152 can be injection molded by plastic parts or other polymer materials, and the first assembly part 116a and its first assembly hole 1161 as well as the second assembly part 116b and its second assembly hole 1162 can be injection molded by plastic parts or other polymer materials to facilitate manufacturing and forming. In addition, the first lever 113 and the first plate 111 connected to the first lever 113 are, for example, stamped from metal parts or other rigid plates. The second lever 114 and the second plate 112 connected to the second lever 114 are, for example, stamped from metal parts or other rigid plates to improve the overall rigidity and achieve thinning requirements. However, the materials of the first plate 111, the second plate 112, the first lever 113, the second lever 114, the first pivot portion 115a, the second pivot portion 115b, the first assembly part 116a and the second assembly part 116b are not limited, it can be made of plastic or metal, or it can be injection molded of the same or different materials.

FIGS. 1A and 1B, the support structure 110 is pivotably disposed between the top plate 106 and the bottom plate 108. The top plate 106 is provided with a plurality of hook structures 106a and 106b relative to the support structure 110, and the bottom plate 108 is provided with a plurality of limiting structures 108*a* and 108*b*. As shown in FIG. 3, the bottom plate 108 is provided with a plurality of first limiting structures 108*a* relative to the first levers 113 of the supporting structure 110, and the bottom plate 108 is provided with a plurality of second limiting structures 108*b* relative to the second levers 114 of the supporting structure 110. In addition, as shown in FIG. 4, the top plate 106 is provided with a plurality of pivot-type hook structures 106*a* relative to the first plate 111 of the support structure 110, and the top plate 106 is provided with a plurality of slot-type hook structure 106*b* relative to the second plate 112 of the support structure 110.

Referring to the schematic cross-sectional view of FIG. 3, the first limiting structure 108*a* is disposed in one end 117 of the first lever 113, and the first limiting structure 108*a* and the end 117 of the first lever 113 interfere with each other in the moving direction of the first lever 113 (+Y axis direction), so that the end 117 of the first lever 113 can be limited in a notch 108*c* of the first limiting structure 108*a*. In addition, the second limiting structure 108*b* is disposed in one end 118 of the second lever 114, and the second limiting structure 108*b* and the end 118 of the second lever 114 interfere with each other in the moving direction of the second lever 114 (−Y axis direction), so that the end 118 of the second lever 114 can be limited in a notch 108*d* of the second limiting structure 108*b*.

In one embodiment, when the touch panel 101 is not pressed, the end 117 of the first lever 113 of the support structure 110 is supported by the elastomer 109*a* and abuts against the notch 108*c* of the first limiting structure 108*a*. The end 118 of the second lever 114 is also limited to the notch 108*d* of the second limiting structure 108*b*; when the touch panel 101 is pressed to move downward, the elastomer 109*a* is compressed, so that the end 117 of the third support structure 110 moves in the −Y axis direction, and the first lever 113 and the second lever 114 are substantially coplanar and arranged on the bottom plate 108 after being pressed.

Figure 4:
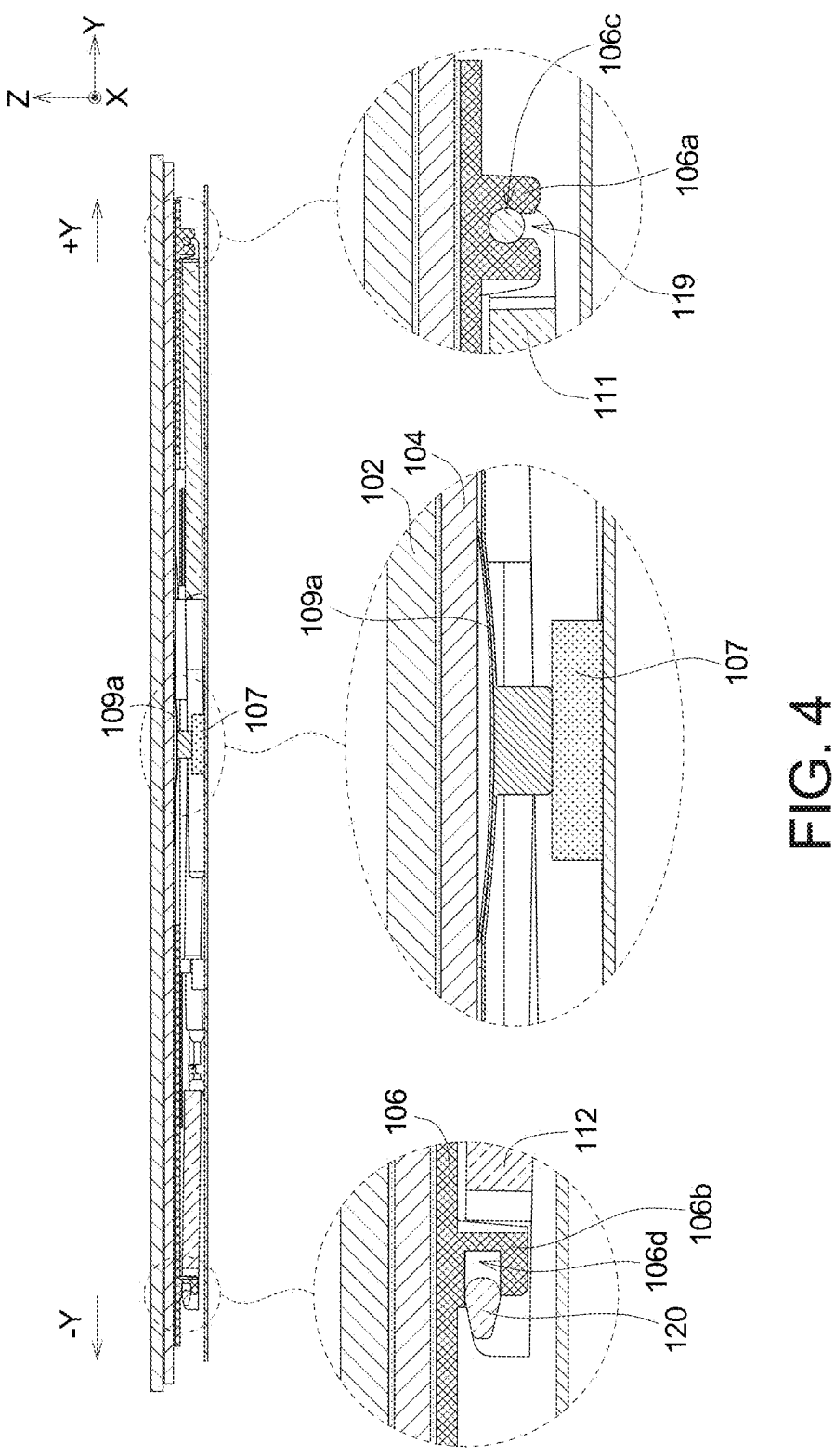
FIG. 4 is a schematic cross-sectional view of a touch panel structure according to an embodiment of the present invention and a partially enlarged schematic view thereof.

Referring to the schematic cross-sectional view of FIG. 4, the pivot-type hook structure 106*a* is disposed in one end 119 of the first plate 111, and the pivot-type hook structure 106*a* and the end 119 of the first plate 111 interfere with each other, so that the end 119 of the first plate 111 may be limited in a notch 106*c* of the pivot-type hook structure 106*a*. In addition, the slot-type hook structure 106*b* is disposed in one end 120 of the second plate 112, and the slot-type hook structure 106*b* and the end 120 of the second plate 112 are locked in the moving direction of the second plate 112 (+Y axis direction), so that the end 120 of the second plate 112 can be limited in a notch 106*d* of the slot-type hook structure 106*b*.

In one embodiment, when the touch panel 101 is not pressed, the first plate 111 of the support structure 110 is pivoted in the notch 106*c* of the pivot-type hook structure 106*a*, and the second plate 112 is also limited in the notch 106*d* of the slot-type hook structure 106*b*; when the touch panel 101 is pressed and moves downward, the elastomer 109*a* is compressed, so that the end 120 of the second plate 112 of the support structure 110 moves toward the −Y axis direction, and the first plate 111 and the second plate 112 are substantially coplanar and arranged on the bottom plate 108 after being pressed.

Figure 5:
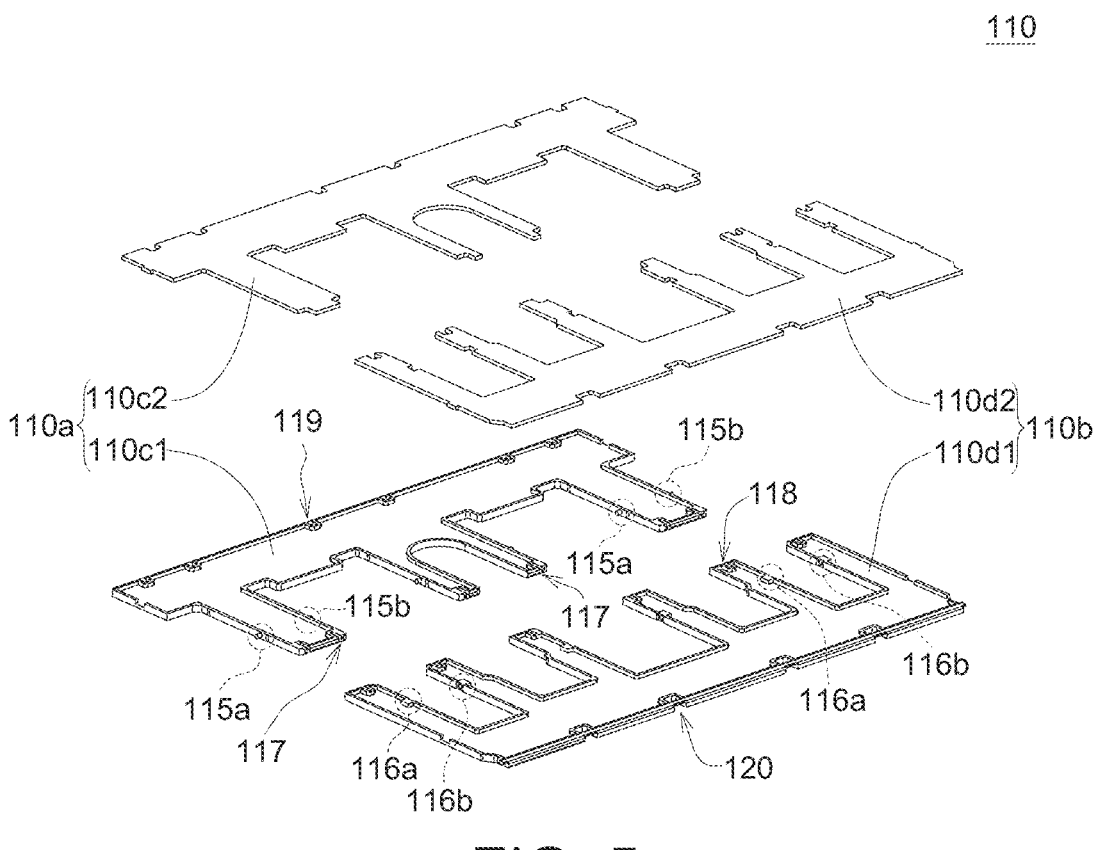
FIG. 5 is a schematic diagram of a support structure according to an embodiment of the present invention.

Referring to FIG. 5, a schematic diagram of a support structure 110 according to an embodiment of the present invention is shown. The support structure 110 includes a first component 110*a* and a second component 110*b*. The first component 110*a* includes an outer shell 110*c*1 and an inner plate 110*c*2. The outer shell 110*c*1 is, for example, a plastic part, and the inner plate 110*c*2 is, for example, a metal part. The outer shell 110*c*1 is formed on the inner plate 110*c*2 by, for example, in-mold injection molding, so that the outer shell 110*c*1 covers the inner plate 110*c*2 and matches the outer shape. The outer shell 110*c*1 and the inner plate 110*c*2 constitute the first plate 111 and a plurality of first levers 113 extending outward from one side of the first plate 111, which are described in the above embodiments.

Referring to FIG. 5, the outer shell 110*c*1 of the first component 110*a* includes a plurality of first pivot portions 115*a* and a plurality of second pivot portions 115*b*, which are respectively provided on opposite sides of the outer shell 110*c*1. In addition, the outer shell 110*c*1 also includes a plurality of first end portions 117 and a plurality of second end portions 119. The first end portions 117 can be used as buckling portions between the first component 110*a* and the first limiting structure 108*a* of the bottom plate 108, and the second end portions 119 can be used as buckling portions between the first component 110*a* and the pivot-type hook structure 106*a* of the top plate 106. Please refer to the above embodiments for related description.

In addition, the second component 110*b* may also include another outer shell 110*d*1 and another inner plate 110*d*2. The outer shell 110*d*1 is, for example, a plastic part, and the inner plate 110*d*2 is, for example, a metal part. The outer shell 110*d*1 is formed on the inner panel 110*d*2 by, for example, in-mold injection molding, so that the outer shell 110*d*1 covers the inner panel 110*d*2 and matches the outer shape. The outer shell 110*d*1 and the inner plate 110*d*2 constitute the second plate 112 and a plurality of second levers 114 extending outward from one side of the second plate 112, which are described in the above embodiments.

The outer shell 110*d*1 of the second component 110*b* includes a plurality of first assembly parts 116*a* and a plurality of second assembly parts 116*b*, which are respectively provided on opposite two sides of the outer shell 110*d*1. In addition, the outer shell 110*d*1 also includes a plurality of third end portions 118 and a plurality of fourth end portions 120. The third end portions 118 can be used as buckling portions between the second component 110*b* and the second limiting structures 108*b* of the bottom plate 108, and the fourth end portions 120 can be used as buckling portions between the second component 110*b* and the slot-type hook structures 106*b* of the top plate 106. Please refer to the above embodiments for related description.

Figure 6A:
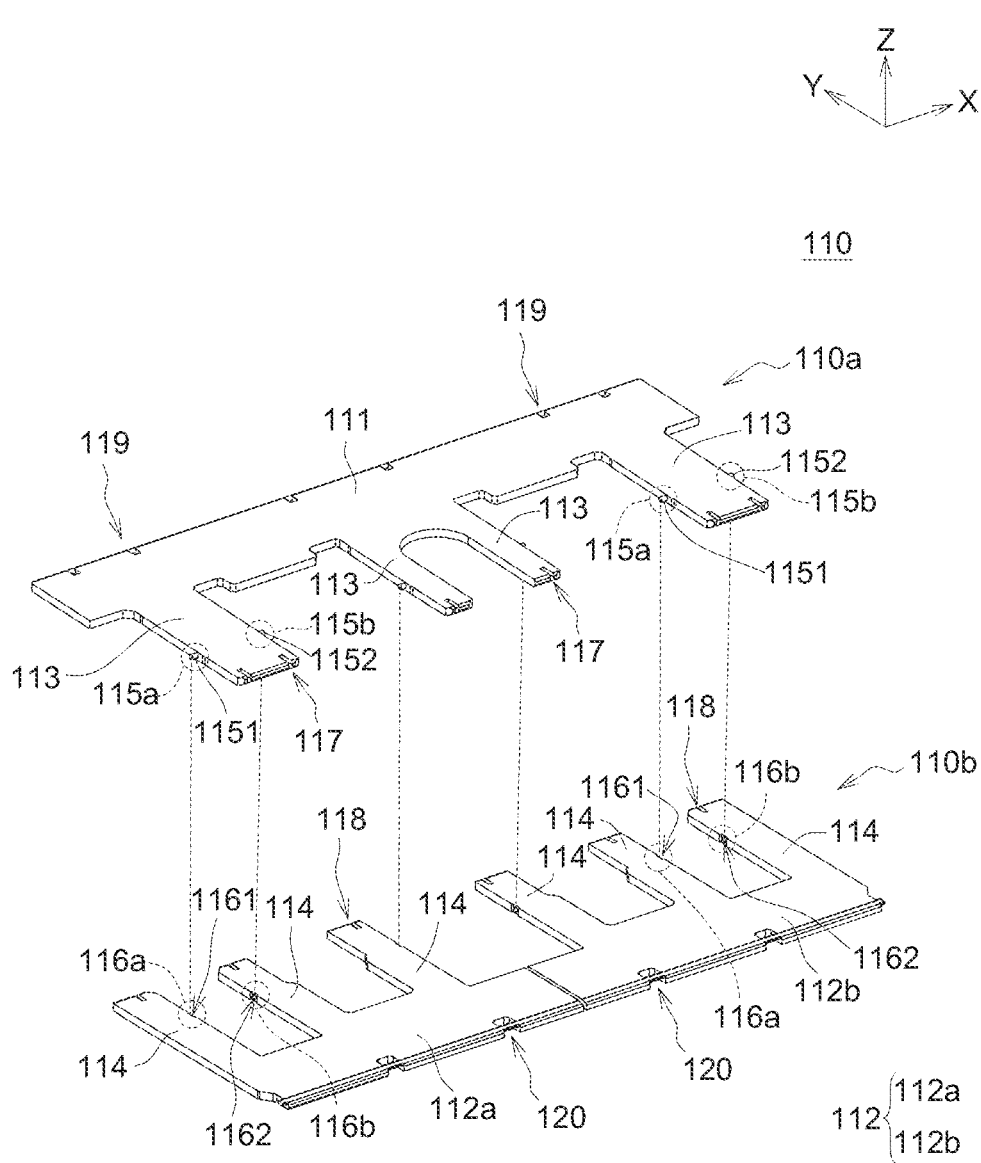
FIGS. 6A and 6B respectively are schematic diagrams of a support structure according to an embodiment of the present invention.
Figure 6B:
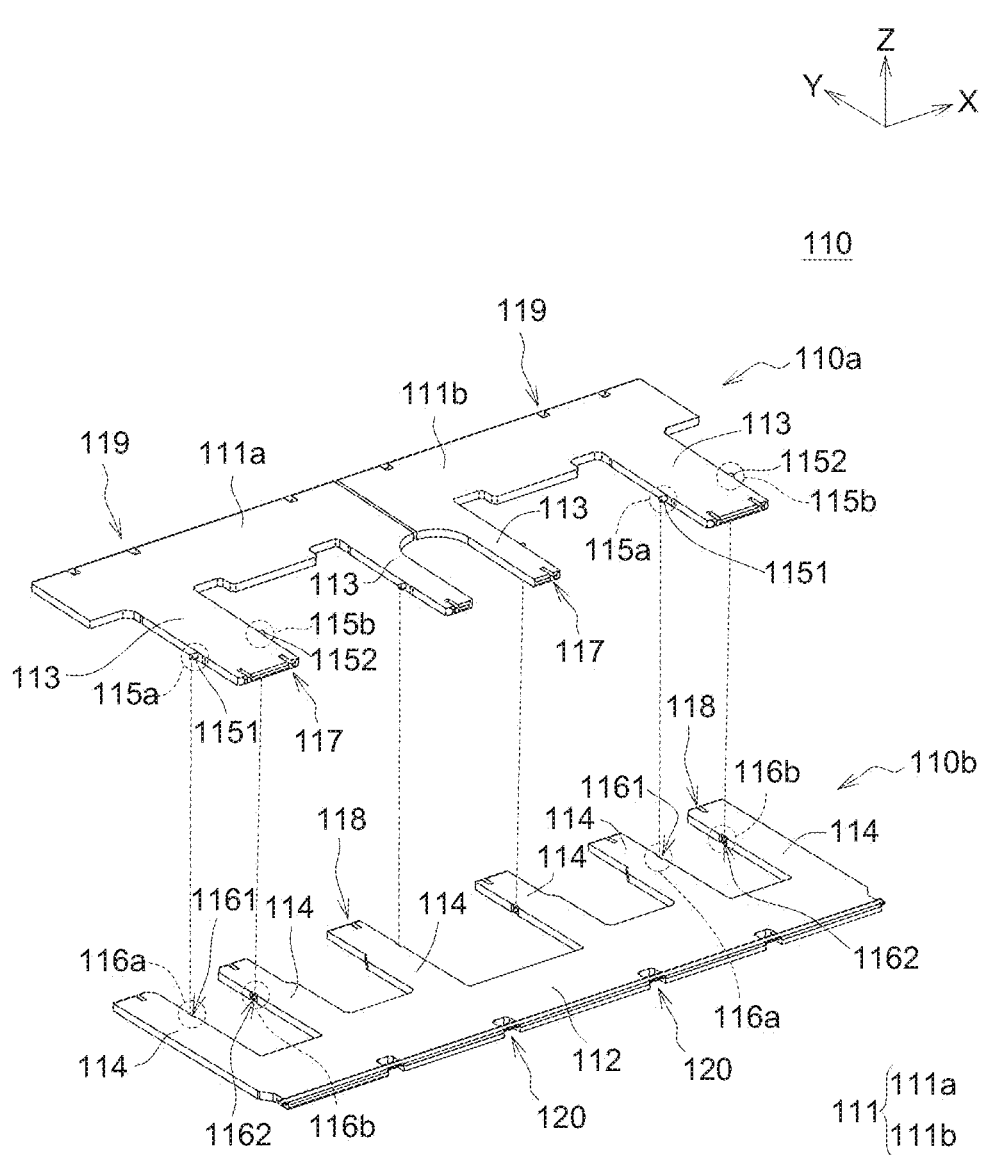

Referring to FIG. 6A and FIG. 6B, schematic diagrams of the support structure 110 according to an embodiment of the present invention are respectively shown. In one embodiment, the first component 110*a* can be formed of a single plate or a combination of multiple plates, and the second component 110*b* can also be formed of a single plate or a combination of multiple plates. As shown in FIG. 6A, the first component 110*a* is formed of a single plate 111, while the second component 110*b* is formed of two plates (the left plate 112*a* and the right plate 112*b*). When the support structure 110 is pressed to move downward, each plate of the second component 110*b* can move independently or together. In addition, as shown in FIG. 6B, the first component 110*a* is formed of two plates (the left plate 111*a* and the right plate 111*b*), while the second component 110*b* is formed of a single plate 112. When the support structure 110 is pressed to move downward, each plate of the first component 110*a* can move independently or together. In addition, the position of the resilient dome 109 in FIG. 1B is not limited to the center, and the number of the resilient dome 109 is not limited to only one. For example, the resilient domes 109 are located at the center of the left plate and the center of the right plate in FIGS. 6A and 6B respectively, so as to generate a press signal corresponding to the movement of the left plate and the right plate.

On the other hand, when the first component 110a is formed of two plates (the left plate 111a and the right plate 111b) or the second component 110b is formed of two plates (the left plate 112a and the right plate 112b), in order to balance the pressing force on the left and right sides, a connecting structure (not shown) can be provided on the periphery of the supporting structure 110. The connecting structure is, for example, U-shaped, along the long side of the supporting structure 110 and pivotally disposed between the top plate 106 and the bottom plate 108 to maintain the pressing force evenly distributed in various areas.

Figure 7A:
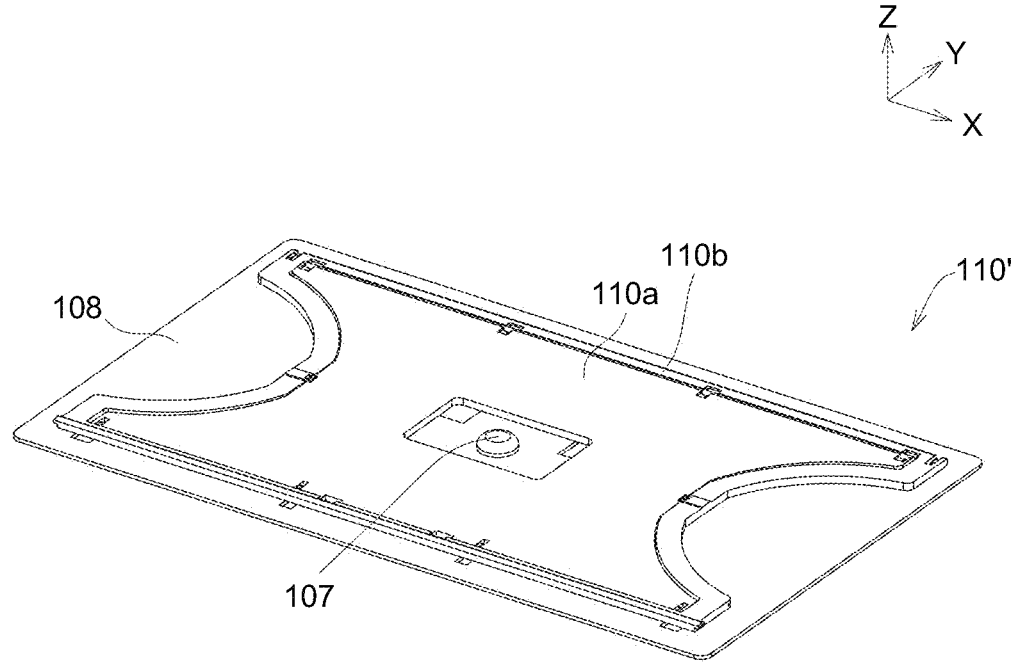
FIGS. 7A and 7B respectively are an assembly schematic view and an exploded schematic view of a support structure and a bottom plate according to another embodiment of the present invention.
Figure 7B:
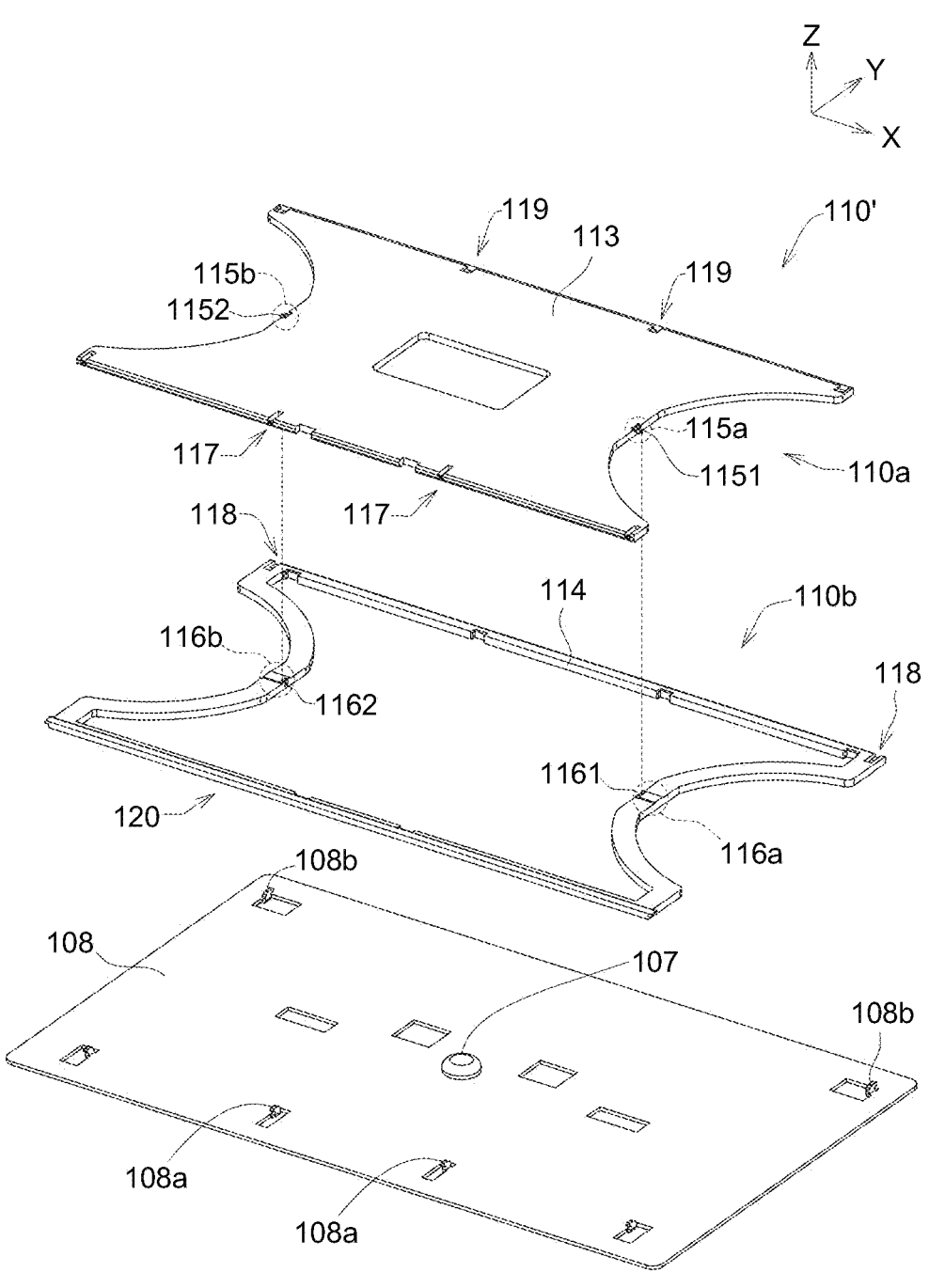

Referring to FIGS. 7A and 7B, an assembly schematic diagram and an exploded schematic diagram of the support structure 110' and the bottom plate 108 according to another embodiment of the present invention are respectively shown. The support structure 110' includes a first component 110a and a second component 110b. The first component 110a includes a first lever 113, a first pivot portion 115a and a second pivot portion 115b. The second component 110b includes a second lever 114, a first assembly part 116a and a second assembly part 116b. The first lever 113 and the second lever 114 are pivotally connected crosswise to form a scissor lift structure. In one embodiment, the first lever 113 is accommodated in a space surrounded by the second lever 114. Therefore, the first lever 113 may be referred to as an inner scissor lever, and the second lever 114 may be referred to as an outer scissor lever. In one embodiment, the length of the first component 110a or the second component 110b in the X-axis direction is greater than half of the length of the board (e.g., the circuit board 104) in the X-axis direction.

Referring to FIG. 7B, the first pivot portion 115a and the second pivot portion 115b are respectively disposed on opposite sides of the first lever 113 along the X-axis direction. The first pivot portion 115a has a first rotating shaft 1151, and each of the second pivot portions 115b has a second rotating shaft 1152. The first rotating shaft 1151 extends outward from one side of the first lever 113, and the second rotating shaft 1152 extends outward from the other side of the first lever 113. The first rotating shaft 1151 and the second rotating shaft 1152 are coaxially arranged and protrude toward different extending directions.

In addition, referring to FIG. 7B, the first assembly part 116a and the second assembly part 116b are respectively disposed on opposite sides of the second lever 114 along the X-axis direction. The first assembly part 116a has a first assembly hole 1161, and the second assembly part 116b has a second assembly hole 1162. The first assembly hole 1161 is recessed inwardly from one side of the second lever 114, and the second assembly hole 1162 is recessed inwardly from the other side of the second lever 114. The first assembly hole 1161 and the second assembly hole 1162 are coaxially arranged and face different directions. The first assembly hole 1161 is arranged relative to the first rotating shaft 1151, and the second assembly hole 1162 is arranged relative to the second rotating shaft 1152.

The materials of the first lever 113, the second lever 114, the first pivot portion 115a, the second pivot portion 115b, the first assembly part 116a and the second assembly part 116b are not limited, and can be made of plastic or metal, etc. The same or different materials can also be used for injection molding.

In one embodiment, the support structure 110' is pivotally disposed between the top plate 106 and the bottom plate 108.

The top plate 106 is provided with a plurality of hook structures 106a and 106b relative to the support structure 110', and the bottom plate 108 is provided with a plurality of limiting structures 108a and 108b relative to the support structure 110'. The position limiting method of the support structure 110' and the bottom plate 108 is similar to the above-mentioned embodiments. Please refer to the description of FIG. 3 and do not describe again here.

Figure 8A:
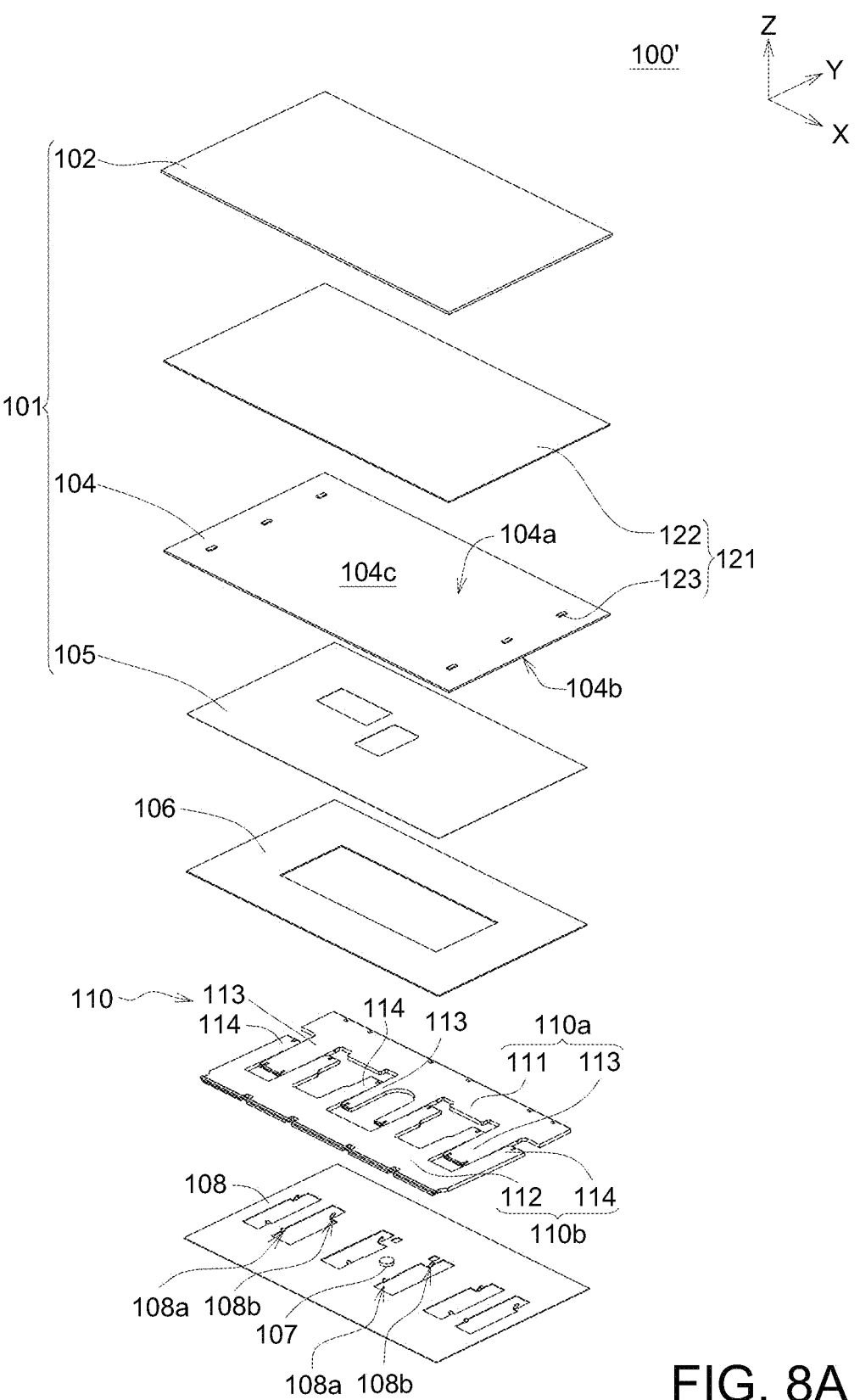
FIGS. 8A and 8B respectively are exploded diagrams of a touch panel structure in different viewing angles according to another embodiment of the present invention.
Figure 8B:

Referring to FIGS. 8A and 8B, exploded diagrams of a touch panel structure 100' in different viewing angles according to another embodiment of the present invention. The touch panel structure 100' includes a support structure 110 and a touch panel 101. The touch panel 101 includes a backlight module 121. For the description of the support structure 110, please refer to FIG. 1A and FIG. 1B and do not describe again here. The support structure 110 may be disposed between a top plate 106 and a bottom plate 108. For example, the support structure 110 may be detachably connected or pivotally connected between the top plate 106 and the bottom plate 108. In one embodiment, the support structure 110 is, for example, a scissor lift structure or a butterfly lift structure. The support structure 110 can move up and down along the Z-axis direction relative to the bottom plate 108 to drive the top plate 106 and the touch panel 101 disposed on the top plate 106 to move up and down along the Z-axis direction.

The touch panel 101 includes a transparent cover 102 (or transparent board), a board (such as a circuit board 104 or other forms of covers), a touch sensing circuit 104c and a resilient dome 109. The circuit board 104 and the top plate 106 are connected by a film 105, for example. The circuit board 104 is disposed on the top plate 106, and the touch sensing circuit 104c is disposed on the first surface 104a of the circuit board 104. The touch sensing circuit 104c is used to sense the change in capacitance when a human body or a conductor touches it, so as to know the touch position. The resilient dome 109 is provided on the second surface 104b of the circuit board 104. The first surface 104a is opposite the second surface 104b. In addition, the bottom plate 108 is provided with a contact member 107, such as a circular mesa sponge. The contact member 107 protrudes from the bottom plate 108 and contacts the resilient dome 109 to reduce pressing noise.

The backlight module 121 is disposed between the transparent cover 102 and the circuit board 104. The backlight module 121 includes a light guide plate 122 and a plurality of light-emitting devices 123. The light-emitting devices 123 are disposed on the circuit board 104, and each light-emitting device 123 is received in a slot 122a of the light guide plate 122 (see FIG. 8B). The slot 122a is recessed inwardly from the lower surface of the light guide plate 122. Therefore, the light generated by the light-emitting devices 123 can enter the light guide plate 122 through the side wall formed by the slot 122a. In addition, the number of the light-emitting devices 123 is not limited, and the light-emitting devices 123 may be an array of light-emitting devices, which are arranged on the circuit board 110 and accommodated in each slot 122a of the light guide plate 122 to serve as a backlight module 121 with dot matrix lighting.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A support structure, comprising:

a first component, including:

more than two first levers disposed in parallel; and a plurality of first pivot portions and a plurality of second pivot portions respectively provided on opposite sides of the first levers, each of the first pivot portions having a first rotating shaft, and each of the second pivot portions having a second rotating shaft; and a second component, including:

more than two second levers disposed in parallel; and a plurality of first assembly parts and a plurality of second assembly parts respectively provided on opposite sides of the second levers, each of the first assembly parts having a first assembling hole, and each of the second assembly parts having a second assembly hole, wherein the first assembly hole is arranged relative to the first rotating shaft, and the second assembly hole is arranged relative to the second rotating shaft, wherein the first component comprises a plurality of first plates that are independent from each other and arranged in parallel, and the first levers are arranged in parallel and extend horizontally from one side of the first plates.

2. The support structure of claim 1, wherein the second component comprises a plurality of second plates that are independent from each other and arranged in parallel, and the second levers are arranged in parallel and extend horizontally from one side of the second plates, wherein the first levers and the second levers extend in opposite directions.

3. The support structure of claim 1, wherein the first levers and the second levers are staggered in a direction perpendicular to the horizontal extension.

4. The support structure of claim 1, wherein a length of the first component or the second component is greater than half of a length of a board on the support structure.

5. The support structure of claim 1, wherein the first component and the second component are respectively formed of an outer shell and an inner plate made of different materials.

6. An electronic device, comprising:

a board having a first surface and a second surface opposite to each other;

a resilient dome provided on the second surface; and a support structure provided on the second surface, the support structure comprising:

a first component; and a second component, wherein the first component and the second component move up and down along with the board, each of the first component and the second component includes more than two levers disposed in parallel for pivotal connection, and the first component comprises a plurality of first plates that are independent from each other and arranged in parallel and a plurality of first levers arranged in parallel and extend horizontally from one side of the first plates.

7. The electronic device of claim 6, wherein the second component comprises the second component comprises a plurality of second plates that are independent from each other and arranged in parallel and a plurality of second levers arranged in parallel and extend horizontally from one side of the second plates, wherein the first levers and the second levers extend in opposite directions.

8. The electronic device of claim 7, wherein a number of the first levers is different from a number of the second levers.

9. The electronic device of claim 7, wherein the first levers and the second levers are staggered in a direction perpendicular to the horizontal extension.

10. The electronic device of claim 6, wherein a length of the first component or the second component is greater than half of a length of the board.

11. The electronic device of claim 6, wherein the first component and the second component are respectively formed of an outer shell and an inner plate made of different materials.

12. The electronic device of claim 7, wherein the first component comprises a first pivot portion and a second pivot portion, the first pivot portion and the second pivot portion are respectively provided on two opposite sides of one of the first levers, the first pivot portion has a first rotating shaft, and the second pivot portion has a second rotating shaft;

the second component comprises a first assembly part and a second assembly part, the first assembly part and the second assembly part are respectively provided on opposite sides of one of the second levers, the first assembly part has a first assembly hole, the second assembly part has a second assembly hole, wherein the first assembly hole is arranged relative to the first rotating shaft, and the second assembly hole is arranged relative to the second rotating shaft.

13. The electronic device of claim 6, wherein the resilient dome comprises an elastomer, and the elastomer is adapted to move up and down with the board.

14. The electronic device of claim 6, further comprising a backlight module disposed on the first surface of the board, the backlight module including a light guide plate and a plurality of light-emitting devices, each of the light-emitting devices is accommodated in a slot of the light guide plate.

15. The electronic device of claim 6, further comprising a contact member disposed on a bottom plate, wherein the support structure is located between the board and the bottom plate, and the contact member protrudes from the bottom plate and in contact with the resilient dome.

16. The electronic device of claim 6, further comprising a top plate and a bottom plate, the top plate is disposed on the second surface, the top plate is provided with at least one hook structure, and the bottom plate is provided with at least one limiting structure, wherein the bottom plate and the top plate are arranged oppositely, and the support structure is provided between the top plate and the bottom plate through the hook structure and the limiting structure.

17. The electronic device of claim 6, wherein the board is a circuit board or a cover.

* * * * *